(12) United States Patent
Kim

(10) Patent No.: US 9,780,614 B2
(45) Date of Patent: Oct. 3, 2017

(54) MOTOR

(71) Applicant: MANDO CORPORATION, Pyeongtaek-si, Gyeonggi-do (KR)

(72) Inventor: Tae Sik Kim, Yongin-si (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 349 days.

(21) Appl. No.: 14/693,502

(22) Filed: Apr. 22, 2015

(65) Prior Publication Data
US 2015/0318773 A1 Nov. 5, 2015

(30) Foreign Application Priority Data
Apr. 22, 2014 (KR) .................. 10-2014-0047911

(51) Int. Cl.
*H02K 1/28* (2006.01)
*H02K 1/27* (2006.01)
*H02K 21/12* (2006.01)
*H02K 16/02* (2006.01)
*H02K 21/02* (2006.01)

(52) U.S. Cl.
CPC ............. *H02K 1/278* (2013.01); *H02K 1/28* (2013.01); *H02K 21/029* (2013.01); *H02K 16/02* (2013.01); *H02K 2201/06* (2013.01); *H02K 2213/09* (2013.01)

(58) Field of Classification Search
CPC ........ H02K 1/28; H02K 1/278; H02K 21/029; H02K 16/02; H02K 2213/09; H02K 7/003; H02K 7/04; H02K 1/27; H02K 2201/06

USPC .... 310/114, 156.24, 156.08, 156.09, 156.12, 310/156.13
See application file for complete search history.

(56) References Cited

U.S. PATENT DOCUMENTS

2002/0100624 A1 * 8/2002 Joong .................. B60K 6/26
180/65.26

FOREIGN PATENT DOCUMENTS

| CN | 102782992 A | 11/2012 |
| JP | 2008-092743 A | 4/2008 |
| JP | 2011-182603 A | 9/2011 |

OTHER PUBLICATIONS

Korean Office Action dated Jul. 16, 2015 issued in Korean Patent Application No. 10-2014-0047911.
Chinese Office Action issued in Application No. 201510191551.5 dated Feb. 22, 2017, with English translation.

* cited by examiner

*Primary Examiner* — Michael Andrews
*Assistant Examiner* — Robert E Mates
(74) *Attorney, Agent, or Firm* — McDermott Will & Emery LLP

(57) ABSTRACT

The present invention relates to a motor. According to one embodiment of the present invention, a skew angle is changed according to a load condition so that noise and vibration can be reduced as compared to a conventional motor.

20 Claims, 6 Drawing Sheets

MOTOR

CROSS-REFERENCE TO RELATED APPLICATION

This application claims priority from and the benefit under 35 U.S.C. §119(a) of Korean Patent Application No. 10-2014-0047911, filed on Apr. 22, 2014, which is hereby incorporated by reference for all purposes as if fully set forth herein.

BACKGROUND OF THE INVENTION

1. Field of the Invention

The present invention relates to a motor, and more particularly, a motor in which a skew angle is changed according to a load condition so that generated noise and vibration can be reduced, as compared to a conventional one.

2. Description of the Prior Art

Cogging torque refers to a ripple type torque generated by an interaction between a rotor (magnet) and a stator (core) in a permanent magnet type motor, and includes forward and reverse torques generated according to a change of magnetic flux of the motor itself even if no current is input.

The cogging torque should be properly reduced since it causes ripple and noise when the motor is operated.

A conventional method for reducing the cogging torque is to apply a skew structure to the rotor or the stator so as to uniformize the change of magnetic flux caused by rotation of the rotor so that the forward and reverse torques are counterbalanced.

Here, skew refers to configuring a permanent magnet to have a magnetic phase difference in the circumferential direction. According to a structure of a motor, a skew structure is obtained, for example, by attaching a ring magnet to a rotor, forming a slot of a stator to be inclined, attaching segment-shaped magnets in a plurality of rows, or attaching an arc-shaped segment magnet to a rotor.

FIG. 1 is a view illustrating an example of a rotor and a stator, to which a magnet skew structure according to a prior art is applied.

As illustrated in FIG. 1, a stator 101 has a cylindrical shape with opened opposite ends, and a plurality of opened slots 103 are formed on the inner surface of the stator 101 at regular intervals along the circumferential. The slots 103 are formed to be separated from each other by slot tees 105, which protrude radially from the inner surface of the stator 101.

A rotor 107 includes segment-shaped magnets 109 and 111, which are attached in vertically two stages, in which the magnets 109 of the upper stage are arranged to deviate from the magnets 111 of the lower stage by a predetermined angle in the circumferential direction, thereby forming a skew structure.

However, a rotor and stator structure, to which the skew structure described is applied, has a problem in that a variation magnitude of torque is changed depending on a magnitude of load applied to the rotor by an electromagnetic force generated by an applied current so that it is impossible to optimize noise and vibration in various load conditions.

SUMMARY OF THE INVENTION

In this background, the present invention is to provide a motor in which a skew angle is changed according to a load condition so that generated noise and vibration can be reduced, as compared to a conventional one.

The aspect of the present invention is not limited thereto, and other unmentioned aspects of the present invention may be clearly appreciated by those skilled in the art from the following descriptions.

According to one embodiment of the present invention, there is provided a motor including rotor assemblies configured to be rotated within a stator and stacked one on another in an axial direction to be relatively rotatable in relation to each other. Each rotor assembly includes: a first rotor including a first outer rotor having a hollow shape, in which a plurality of first magnet members are mounted on an outer circumferential surface of the first outer rotor, and a first support recess, which is radially recessed, is formed on a hollow inner circumferential surface of the first outer rotor, a first inner rotor inserted into the first outer rotor, in which a first latch is formed on an outer circumferential surface of the first inner rotor to be inserted into the first support recess, and first elastic support provided in the first support recess so as to elastically support the first latch to one side in a circumferential direction; and a second rotor including a second outer rotor having a hollow shape, in which a plurality of second magnet members are mounted on an outer circumferential surface of the second outer rotor and a second support recess, which is radially recessed, is formed on a hollow inner circumferential surface of the second outer rotor, a second inner rotor inserted into the second outer rotor, in which a second latch is formed on an outer circumferential surface of the second inner rotor to be inserted into the second support recess, and second elastic support provided in the second support recess so as to elastically support the second latch to the other side in a circumferential direction. The first rotor and the second rotor are arranged to deviate from each other so as to form a skew angle.

According to one embodiment of the present invention, a skew angle is changed according to a load condition so that noise and vibration can be reduced as compared to a conventional motor.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, some embodiments of the present invention will be described in detail with reference to the exemplary drawings. In the following description, It should be appreciated that when one component is described as being "connected," "coupled" or "joined" to another component, a third component may be "connected," "coupled," and "joined" between the first and second components, although the first component may be directly connected, coupled or joined to the second component.

Figure 1:
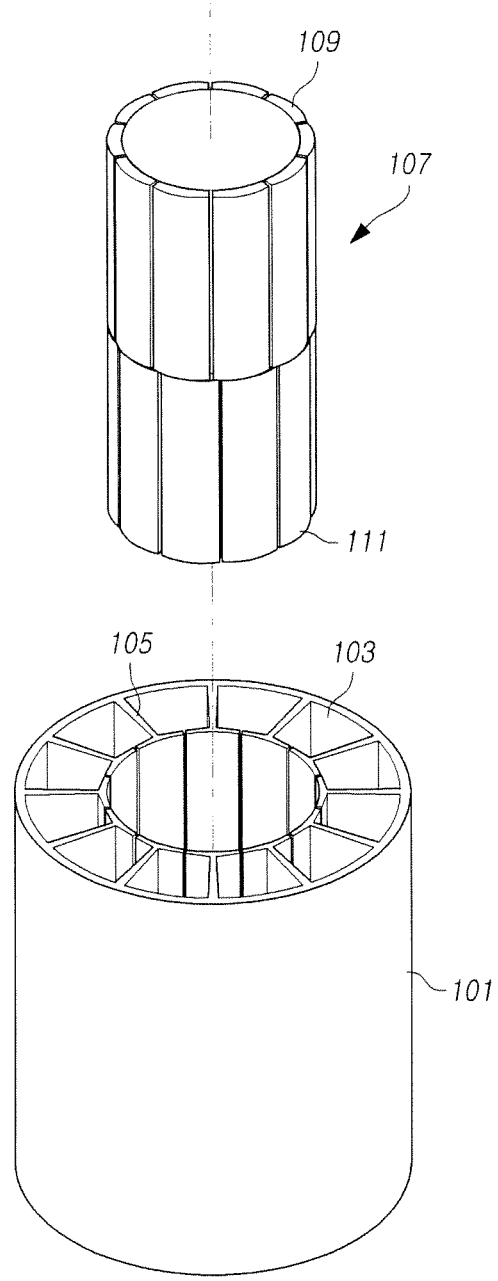
FIG. 1 is a view illustrating an example of a rotor and a stator, to which a magnet skew structure according to a prior art is applied.
Figure 2:
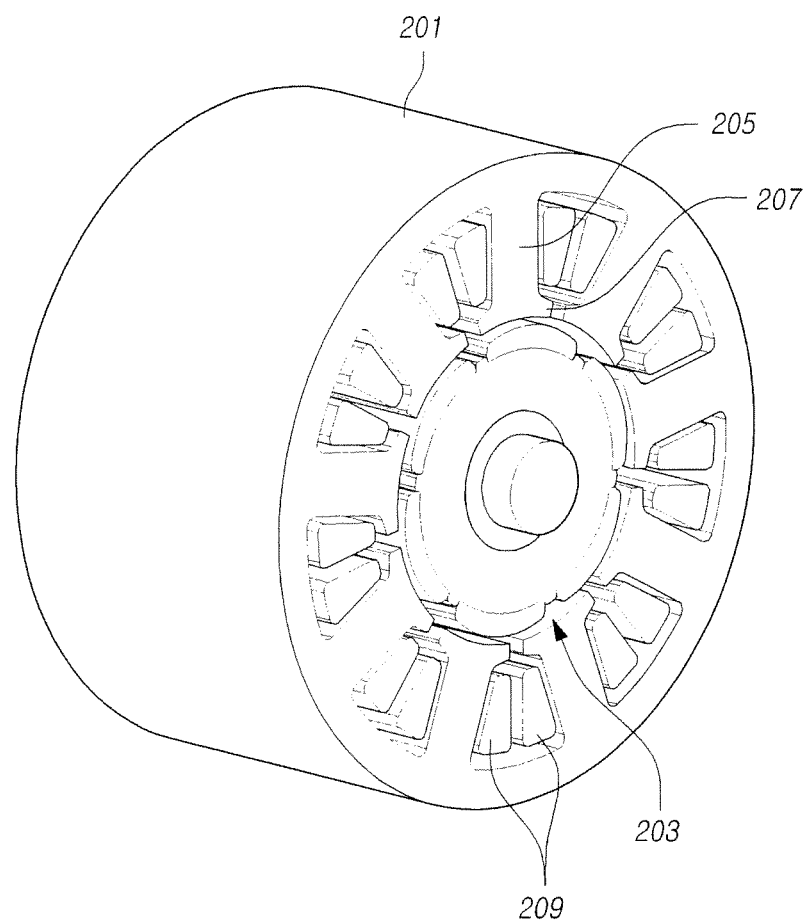
FIG. 2 is a perspective view illustrating a rotor assembly of a motor according to one embodiment.
Figure 3:
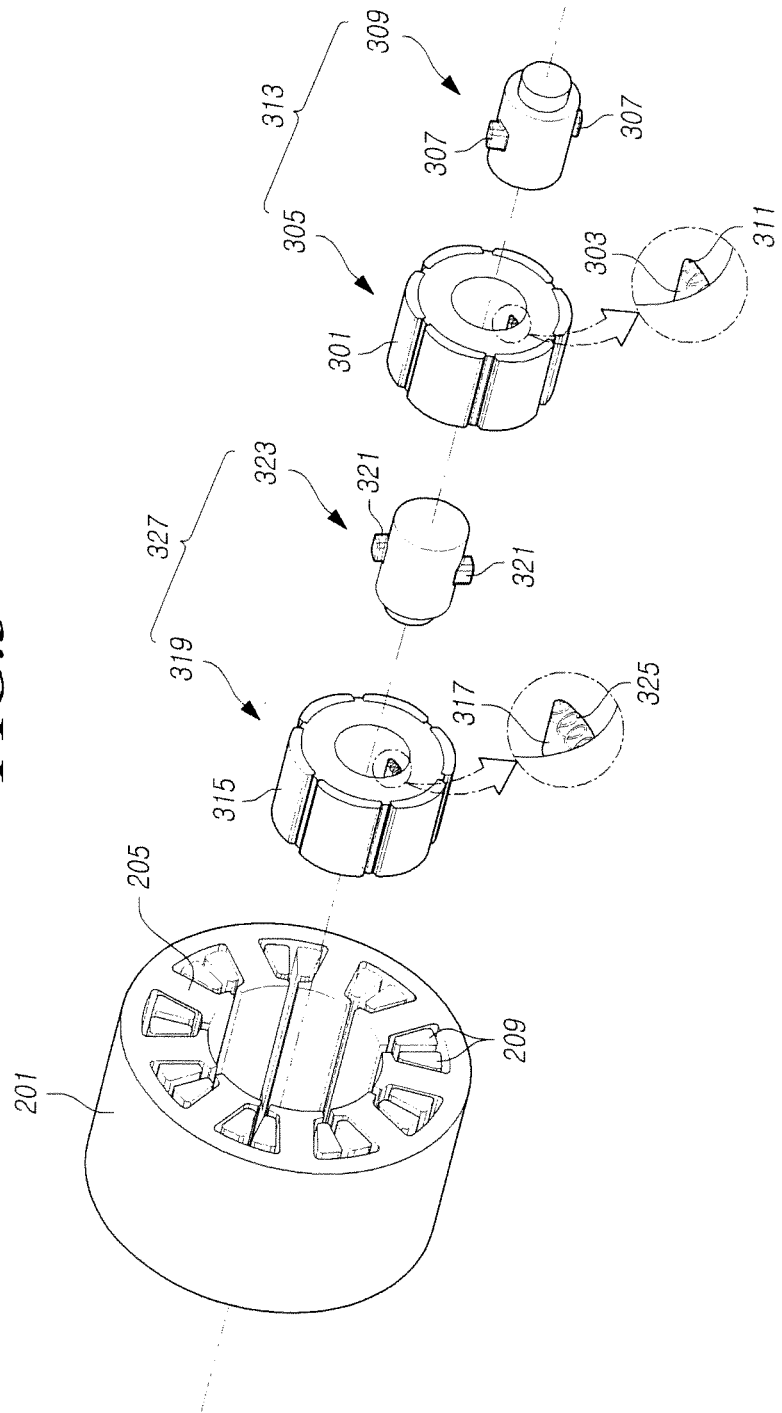
FIG. 3 is an exploded perspective view of the rotor assembly of FIG. 2.
Figure 4:
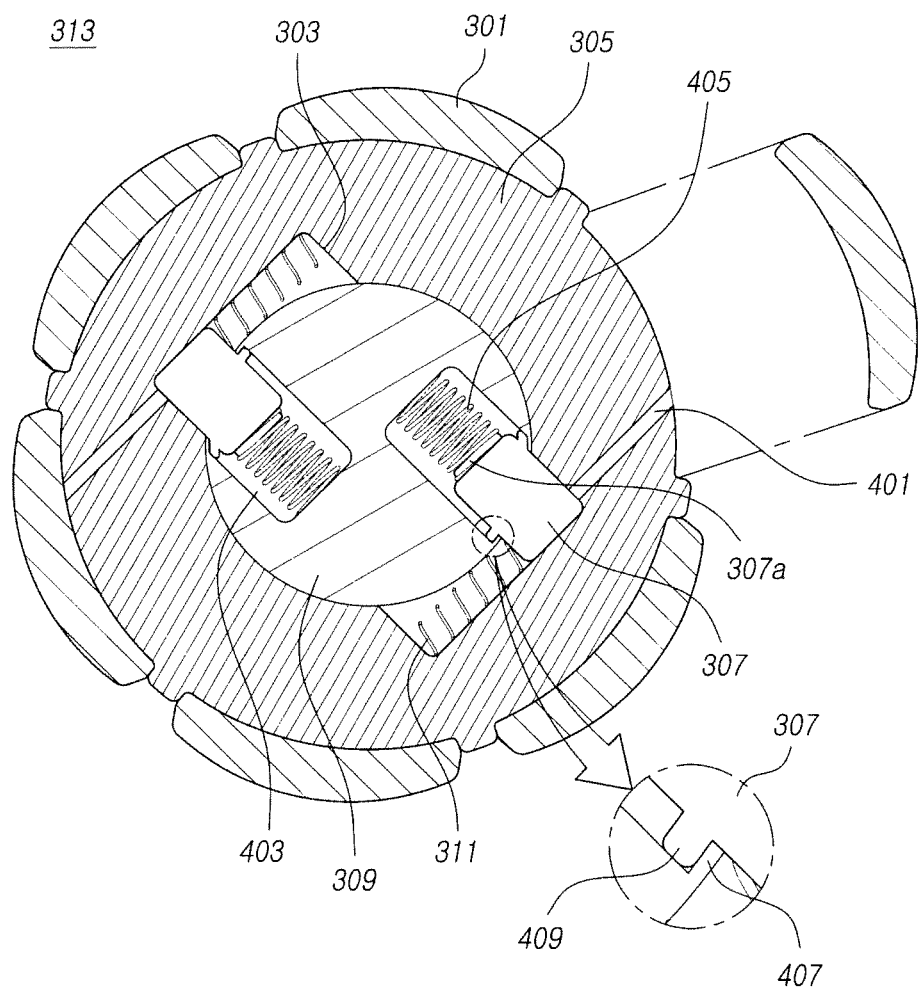
FIG. 4 is a cross-sectional view of a first rotor illustrated in FIG. 3.

FIG. 2 is a perspective view illustrating a rotor assembly of a motor according to one embodiment. FIG. 3 is an exploded perspective view of the rotor assembly of FIG. 2. FIG. 4 is a cross-sectional view of a first rotor illustrated in FIG. 3. FIGS. 5a and 5b are views schematically illustrating changes of skew angles of a first rotor and a second rotor in a no load condition and a load condition. FIG. 6 is a graph representing an optimal skew angle according to a current.

As illustrated in the drawings, a motor according to one embodiment of the present invention includes rotor assemblies 203 configured to be rotated within a stator 201 and stacked one on another in an axial direction to be relatively rotatable in relation to each other. Each rotor assembly 203 includes: a first rotor 313 including a first outer rotor 305 having a hollow shape, in which a plurality of first magnet members 301 are mounted on an outer circumferential surface of the first outer rotor 305 and a first support recess 303, which is radially recessed, is formed on a hollow inner circumferential surface of the first outer rotor 305, a first inner rotor 309 inserted into the first outer rotor 305, in which a first latch 307 is formed on an outer circumferential surface of the first inner rotor 309 to be inserted into the first support recess 303, and first elastic support 311 provided in the first support recess 303 so as to elastically support the first latch 307 to one side in a circumferential direction; and a second rotor 327 including a second outer rotor 319 having a hollow shape, in which a plurality of second magnet members 315 are mounted on an outer circumferential surface of the second outer rotor 319 and a second support recess 317, which is radially recessed, is formed on a hollow inner circumferential surface of the second outer rotor 319, a second inner rotor 323 inserted into the second outer rotor 319, in which a second latch 321 is formed on an outer circumferential surface of the second inner rotor 323 to be inserted into the second support recess 317, and a second elastic support 325 provided in the second support recess 317 so as to elastically support the second latch 321 to the other side in a circumferential direction. The first rotor 313 and the second rotor 327 are arranged to deviate from each other so as to form a skew angle.

The stator 201 has a cylindrical shape and includes a plurality of tees 205 formed on the inner surface, in which the tees 205 protrude radially inwardly and are arranged at regular intervals in the circumferential direction.

Meanwhile, ridges 207 are formed on an end of each of the tees 205 to extend to the opposite sides in the circumferential direction, and a slot is formed between each two adjacent tees 205 and provided with a coil 209.

Rotor assemblies 203 are configured to be rotated within the stator 201, and stacked one on another in the axial direction to be relatively rotatable in relation to each other.

An example of the rotor assemblies 203 is described in more detail. Each rotor assembly 203 includes a first rotor 313 and a second rotor 327.

The first rotor 313 and the second rotor 327 are arranged to be relatively rotatable in relation to each other, and a skew angle is formed between the first rotor 313 and the second rotor 327.

The first rotor 313 includes a first outer rotor 305, a first inner rotor 309, and a first elastic support 311.

The first outer rotor 305 is formed in a hollow cylindrical shape. A plurality of first magnet members 301 are mounted on the outer circumferential surface of the first outer rotor 305. The first magnet members 301 are mounted on the outer circumferential surface of the first outer rotor 305 at regular intervals in the outer circumferential direction. A first support recess 303, which is radially recessed, is formed on the inner circumferential surface of the first outer rotor 305. A pair of first support recesses 303 may be formed on the inner circumferential surface of the first outer rotor 305 to face each other.

Meanwhile, the first outer rotor 305 may have a first through-holes 401 formed to communicate with the first support recesses 303, respectively, in which the first through-holes 401 function as a passage into which a device is inserted so as to press the first elastic supports 311 provided in the first support recesses 303 when assembling the first rotor 313.

Here, as the device to press the first elastic support 311 may be provided in an elongated bar shape, for example. An assembly method of the first rotor 313 will be described later.

The first inner rotor 309 is inserted into the first outer rotor 305, and a first latch 307 is formed on the outer circumferential surface of the first inner rotor 309 to be inserted into the first support recess 303.

In addition, first grooves 403 are formed inside the first inner rotor 309 so that the first latches 307 may be introduced inside the first inner rotor 309, and first elastic members 405 are provided within the first grooves 403 to elastically support the first latches 307, respectively. Here, the first grooves 403 are formed such that central axes thereof are parallel to each other.

Since the first elastic members 405 are provided in the first grooves 403 as described above, when the first inner rotor 309 is inserted into the first outer rotor 305, the first latches 307 are completely introduced into the first grooves 403, respectively, and after the first inner rotor 309 is completely inserted into the first outer rotor 305, first latches 307 protrude out by the elastic restoring force of the first elastic members 405 to be positioned within the first support recesses 303, respectively.

Meanwhile, a first ridge 407 is formed on a radial end of each first groove 403, and a first stop portion 409 extending outwardly is formed on the outer circumferential surface of the first latch 307 to be caught by the first ridge 407. Since the first ridge 407 is formed in each first groove 403 and the first stop portion 409 is formed on each first latch 307, the length of each first latch 307 protruding from the corresponding first groove 403 to the outside is limited.

In addition, a fixing protrusion 307a is formed on a lower portion of each first latch 307 (that is, on the radially inner bottom portion) so that the corresponding first elastic member 405 is fitted on the protrusion to be fixed.

The first elastic supports 311 are provided in the first support recesses 303 so as to elastically support the first latches 307, respectively, to one side in the circumferential direction.

That is, as illustrated in FIG. 4, the first elastic supports 311 are adapted to elastically support the first latches 307 counterclockwise, thereby elastically supporting the first inner rotor 309 itself counterclockwise.

Now, descriptions will be made on an assembly method of the first rotor 313 configured as described. A technician starts to insert the first inner rotor 309 into the first outer rotor 305 in the state where the first latches 307 are pressed so that the first latches 307 are maintained in the state where they are introduced into the first inner rotor 309.

At this time, the first magnet members 301 are not mounted on the first outer rotor 305 yet. Each of the first elastic supports 311 is inserted into one of the first support recesses 303, the device to press the first elastic support 311 is introduced into the corresponding first through-hole 401 so as to press the first elastic support 311, and then the first inner rotor 309 is completely inserted into the first outer rotor 305.

When the first inner rotor 309 is completely inserted into the first outer rotor 305, the first latches 307 protrude into the first support recesses 303, respectively, by the elastic restoring force of the first elastic members 405. At this time, when the devices to press the first elastic supports 311 are removed, the first elastic supports 311 are elastically restored to press the side surfaces of the first latches 307.

Thereafter, the technician mounts the first magnet members 301 on first outer rotor 305 to complete the assembly process of the first rotor 313.

Subsequently, the second rotor 327 includes a second outer rotor 319, a second inner rotor 323, and a second elastic support 325.

Since the detailed structure and assembly method of the second rotor 327 are the same as those of the first rotor 313 described above, detailed descriptions thereof will be omitted. According to the claims, the second grooves, the second elastic members, the second ridges, and the second stop portions of the second rotor 327 correspond to the first grooves 403, the first elastic members 405, the first ridges 407, and the first stop portions 409 of the first rotor 313.

However, the second elastic supports 325 are provided in the second support recesses 317, respectively, to elastically support the second latches 321 to the other side in the circumferential direction, in which the first elastic supports 311 and the second elastic supports 325 are parallel to each other and opposite to each other in the support directions thereof.

That is, as described above, the first elastic supports 311 of the first rotor 313 elastically support the first latches 307 to one side in the circumferential direction (i.e., counterclockwise with reference to FIG. 4), but the second elastic supports 325 of the second rotor 327 elastically support the second latches 321 to the other side in the circumferential direction (i.e., clockwise).

Figure 5:
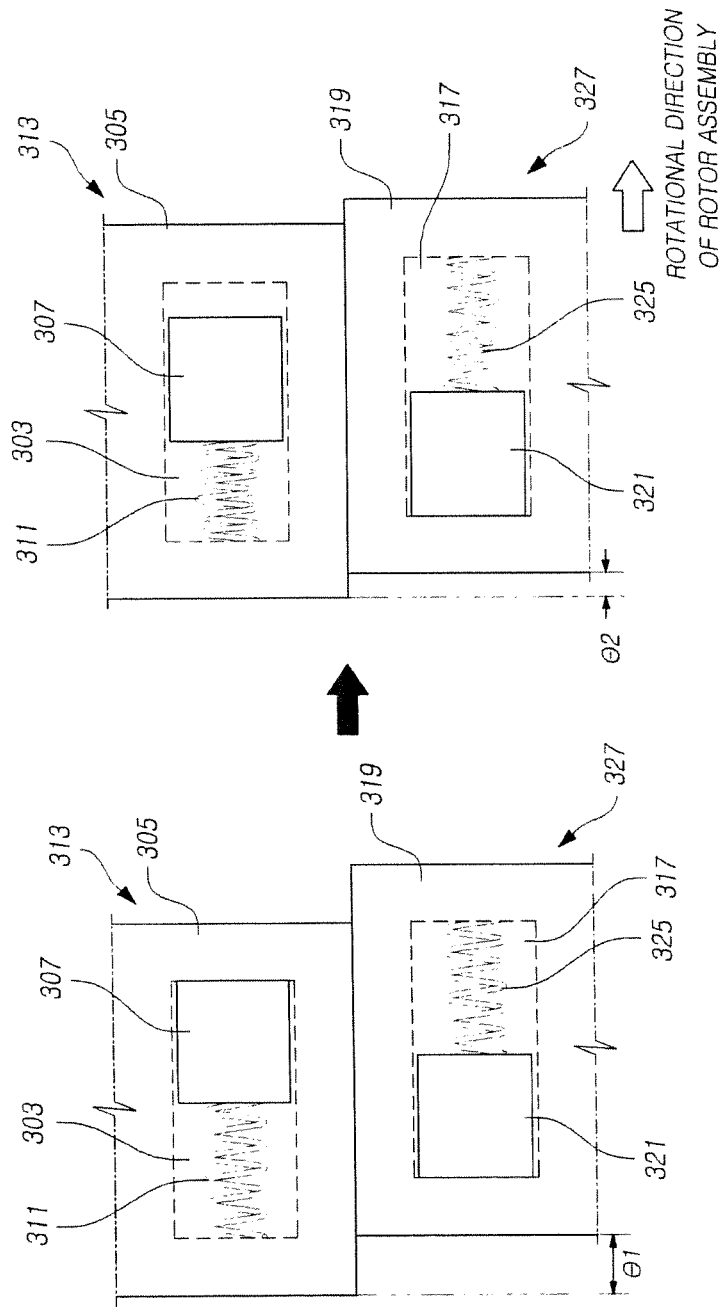
FIGS. 5A and 5B are views schematically illustrating changes of skew angles of a first rotor and a second rotor in a no load condition and a load condition.
Figure 6:
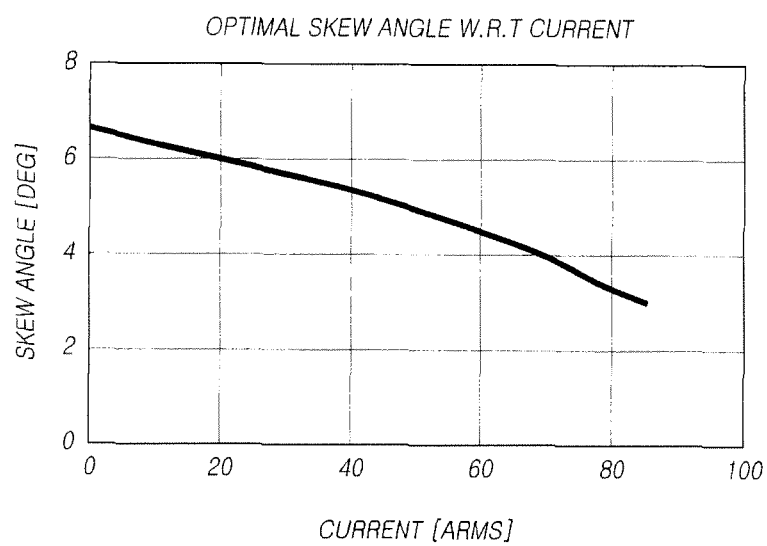
FIG. 6 is a graph representing an optimal skew angle according to a current.

Referring to FIG. 5, descriptions will be made on a change in skew angles of the first rotor 313 and the second rotor 327 of the rotor assembly 203 according to one embodiment of the present invention in a no load condition and a load condition.

First, in the no load condition (FIG. 5a), the first rotor 313 and the second rotor 327 rotate while forming a skew angle θ1.

At this time, the first latches 307 get in close contact with the side surfaces of the first support recesses 303 by the first elastic supports 311, respectively, and the second latches 321 get in close contact with the side surfaces of the second support recesses 317 by the second elastic supports 325, respectively.

Meanwhile, a rotational torque is generated in the outer rotors 305 and 319 due to a current applied to the motor so that in a load condition where load is applied (FIG. 5b), the first rotor 313 and the second rotor 327 rotate while forming a skew angle θ2.

At this time, the first latches 307 are separated from the side surfaces of the first support recesses 303 and the first elastic supports 311 are compressed. Consequently, the skew angle θ2 becomes smaller than the skew angle θ1.

Accordingly, in the load condition and the no load condition, the skew angles of the first rotor 313 and the second rotor 327 are changed. When, for example, elastic moduli of the first elastic supports 311 and the second elastic supports 325 are adjusted so that an optimal skew angle with respect to an applied current can be implemented as illustrated in FIG. 6, the skew angle can be changed to reduce noise and vibration in the load condition.

Of course, when the rotor assembly 203 is rotated in the direction opposite to the direction illustrated in FIG. 5 in the load condition, the first latches 307 get in close contact with the side surfaces of the first support recesses 303, and the second latches 321 are separated from the side surfaces of the second support recesses 317.

As described above, according to one embodiment of the present invention, the skew angle is changed according to the load condition so that noise and vibration can be reduced as compared to the conventional motor.

Even if it was described above that all of the components of an embodiment of the present invention are coupled as a single unit or coupled to be operated as a single unit, the present invention is not necessarily limited to such an embodiment. The scope of the present invention shall be construed on the basis of the accompanying claims in such a manner that all of the technical ideas included within the scope equivalent to the claims belong to the present invention.

What is claimed is:

1. A motor comprising:
   rotor assemblies configured to be rotated within a stator and stacked one on another in an axial direction to be relatively rotatable in relation to each other,
   wherein each rotor assembly includes:
   a first rotor including a first outer rotor having a hollow shape, in which a plurality of first magnet members are mounted on an outer circumferential surface of the first outer rotor and a first support recess, which is radially recessed, is formed on a hollow inner circumferential surface of the first outer rotor, a first inner rotor inserted into the first outer rotor, in which a first latch is formed on an outer circumferential surface of the first inner rotor to be inserted into the first support recess, and first elastic support provided in the first support recess so as to elastically support the first latch to one side in a circumferential direction; and
   a second rotor including a second outer rotor having a hollow shape, in which a plurality of second magnet members are mounted on an outer circumferential surface of the second outer rotor and a second support recess, which is radially recessed, is formed on a hollow inner circumferential surface of the second outer rotor, a second inner rotor inserted into the second outer rotor, in which a second latch is formed on an outer circumferential surface of the second inner rotor to be inserted into the second support recess, and second elastic support provided in the second support recess so as to elastically support the second latch to the other side in a circumferential direction,
   wherein the first rotor and the second rotor are arranged to deviate from each other so as to form a skew angle.

2. The motor of claim 1, wherein a pair of first support recesses are formed on an inner circumferential surface of the first outer rotor to face each other.

3. The motor of claim 2, wherein a pair of first latches are formed to be symmetric to each other about a central axis of the first inner rotor.

4. The motor of claim 3, wherein first grooves are formed inside the first inner rotor so that the first latches are introduced inside the first inner rotor.

5. The motor of claim 4, wherein the first grooves are formed such that central axes thereof are parallel to each other.

6. The motor of claim 4, wherein first elastic members are provided within the first grooves to elastically support the first latches, respectively.

7. The motor of claim 6, wherein each of the first latches includes a fixing protrusion famed on a lower portion thereof so that each of the first elastic members is fitted on the fixing protrusion to be fixed.

8. The motor of claim 4, wherein each of the first grooves includes a first ridge formed on a radially outer end thereof.

9. The motor of claim 8, wherein each of the first latches includes a first stop portion formed on an outer circumferential surface thereof to extend outwardly to be caught to the first ridge.

10. The motor of claim 1, wherein a pair of second support recesses are formed on the inner circumferential surface of the second outer rotor to face each other.

11. The motor of claim 10, wherein a pair of second latches are formed to be symmetric to each other about a central axis of the second inner rotor.

12. The motor of claim 11, wherein second grooves are formed inside the second inner rotor so that the second latches are introduced inside the second inner rotor.

13. The motor of claim 12, wherein the second grooves are formed such that central axes thereof are parallel to each other.

14. The motor of claim 12, wherein second elastic members are provided within the second grooves to elastically support the second latches, respectively.

15. The motor of claim 14, wherein each of the second latches includes a fixing protrusion formed on a lower portion thereof so that each of the second elastic members is fitted on the fixing protrusion to be fixed.

16. The motor of claim 12, wherein each of the second grooves includes a second ridge formed on a radially outer end thereof.

17. The motor of claim 16, wherein each of the second latches includes a second stop portion formed on an outer circumferential surface thereof to extend outwardly to be caught to the second ridge.

18. The motor of claim 1, wherein the first outer rotor includes a first through-hole communicated with the first support recess so that a device to press the first elastic support is inserted into the first through-hole when the first rotor is assembled.

19. The motor of claim 1, wherein the second outer rotor includes a second through-hole communicated with the second support recess so that a device to press the second elastic support is inserted into the second through-hole when the second rotor is assembled.

20. The motor claim 1, wherein the first elastic support and the second elastic support are parallel to each other and opposite to each other in supporting directions thereof.

\* \* \* \* \*